Patented Sept. 17, 1935

2,014,924

UNITED STATES PATENT OFFICE 2,014,924

TREATMENT OF MOTOR FUEL

Wayne L. Benedict, Chicago, Ill., assignor to Universal Oil Products Company, Chicago, Ill., a corporation of Delaware No Drawing. Application February 17, 1934, Serial No. 711,732

11 Claims. (Cl. 44—9)

This invention refers more particularly to the treatment of cracked motor fuels produced from the heavier portions of petroleum and other similar materials although it has application also to analogous straight run products.

In a more specific sense the invention has reference to the treatment of motor fuel by means adapted to preserve its valuable properties while under storage conditions, particularly when exposed to light and oxidizing influences.

Cracked motor fuel fractions which have not been subjected to extensive refining treatments stand generally in contrast to straight run gasolines in several respects. They frequently have a higher sulphur content which accounts for their unpleasant odor and they are subject to fairly rapid deterioration on standing due to polymerization and condensation reactions among the various types of olefins which constitute a substantial percentage of the hydrocarbons which go to make up their total composition. To offset some of these disadvantages the cracked products have a uniformly higher knock rating than straight run products, though this may also depreciate to some extent along with the loss of color and the development of gums which usually occur simultaneously though not necessarily so.

In rendering gasolines sufficiently stable to permit their storage over reasonable periods of time two general courses of action are open, the first consisting in treating out the offending constituents by means of chemicals and by polymerization reactions induced by various solid contact materials and the second consisting in using small quantities of inhibitors to stabilize the more reactive compounds and render them less readily polymerized under the influence of oxygen and light.

It is with processes of the latter character involving the use of a particular class of inhibiting materials that the present invention is concerned.

In one embodiment the present invention comprises the use of compounds formed by interacting aliphatic amines and fatty acids as inhibitors in preventing the development of undesirable color and cloudiness in gasolines.

The best and most preferable compounds are those containing amine and fatty acid radicals wherein the alkyl group or the amine radical has more than four carbon atoms, e. g. triamyl amine and preferably wherein there is more than one amine radical. Preferably the fatty acid radical is of high molecular weight such as oleic acid.

Broadly the term "aliphatic amine" includes all compounds in which the hydrogen atoms of ammonia are partly or completely replaced by alkyl residues. The replacement of one ammonia hydrogen atom, as in the compound ethyl amine, ($C_2H_5NH_2$), forms a series of compounds known as primary amines; replacement of two hydrogen atoms, as in the compound diethyl amine $$((C_2H_5)_2NH),$$

forms the series of secondary amines and the complete replacement of all three hydrogen atoms, as in the compound triethyl amine $$((C_2H_5)_3N),$$

forms a series of compounds known as the tertiary amines which are also called nitrile bases to distinguish them from alkyl cyanides or acid nitriles.

The tertiary amines show their alkaline character by forming direct addition compounds with such acids as hydrochloric and picric acids, for example, the hydrochloride of trimethyl amine has the formula $N(CH_3)_3HCl$ and a melting point of 271 to 275° C., while the picrate has the formula $C_6H_2(NO_2)_3 \cdot ON(CH_3)_3$ and a melting point of 216° C.

In forming the compounds which are employed in preventing development of color and haze in the gasolines, the present invention comprises the use of the various aliphatic amines though it is not intended to infer that the different compounds of this general class are exact equivalents or that the compounds formed by their interaction with different fatty acids have identical inhibiting value. Not only will the character of the inhibiting compounds themselves vary but the need for protection against deteriorating influences will vary with different gasolines according to the stock from which they were prepared by distillation or cracking and the conditions of their preparation. By chemically combining different aliphatic amines and different fatty acids of varying molecular weight, a large number of alternatives is presented and any one of these may be employed if and whenever found suitable.

Formic acid is the simplest of the series of the so-called fatty acids, this acid having the formula HCOOH, the higher molecular weight homologs being formed by substituting the first hydrogen atom with other alkyl radicals of either a saturated or an unsaturated character. For purposes of reference the names and formulas of some of the lower molecular weight saturated fatty acids are given below:

| Name | Formula | M. P. °C. | B. P. °C. |
|---|---|---|---|
| Formic acid | HCOOH | 8.6 | 100.6 |
| Acetic acid | CH₃COOH | 16.7 | 118 |
| Propionic acid, methyl acetic acid | CH₃CH₂—CO₂H | —36.5 | 140 |
| n-Butyric acid, ethyl acetic acid | CH₃(CH₂)₂CO₂H | | 163 |
| Isobutyric acid, dimethyl acetic acid | $\mathrm{CH_3 \atop CH_3}$>CH—CO₂H | —79 | 155 |
| n-Valeric acid, n-propyl acetic acid | CH₃(CH₂)₃CO₂H | —59 | 186 |
| Isovaleric acid, isopropyl acetic acid | C₃H₇CH₂—CO₂H | —51 | 174 |
| Methyl ethyl acetic acid | $\mathrm{CH_3 \atop C_2H_5}$>CH—CO₂H | | 175 |
| Trimethyl acetic acid, pivallic acid. | (CH₃)₃C.CO₂H | +35 | 163 |

The higher fatty acids may also be used forming the inhibiting compounds but the list of these acids is extensive and only a few will be mentioned, to-wit: such acids as oleic, palmitic, stearic, and such acids as lauric and myristic which are obtained from vegetable oils and fats by the usual saponification processes.

The compounds whose use in gasoline constitutes the subject matter of the present invention may be looked upon as soaps of the amines and the acids. The different basic and acidic compounds which may be reacted may require somewhat varying conditions of temperature and pressure to insure their reaction. In some cases with the more reactive amines such as the tertiary amines and the more reactive acids such as those of lower molecular weight including formic, acetic, propionic, etc., the soaps may be formed at ordinary or moderately elevated temperatures, while with the less reactive amines such as mono and di amines and the higher molecular weight acids elevated temperatures and pressures may be necessary to insure the required degree of combination.

The use of the soaps according to the present invention is to be definitely distinguished from the use of the separate uncombined ingredients in the gasoline, since it has been found that the mere presence of equivalent quantities of the bases and acids does not insure the same preservation of properties as their corresponding compounds.

The class of compounds under discussion as forming the subject matter of the invention is principally valuable in retarding the development of color and haze in gasolines which are under the influence of light during their exposure in visible pumps. It is observable at some times that color and cloud formation in gasolines seems to precede the development of objectionable quantities of gum although this rule is not invariable and the development of color and gum may proceed concurrently though it is seldom noted that gum formation proceeds unaccompanied by deepening of color or that appreciable amounts of gum are formed before the intensity of color increases or a cloud or haze becomes evident.

It is within the scope of the present invention to employ gum inhibitors along with the compounds proposed for color inhibition. The inventor recognizes that a large number of gum inhibitors have been tested and found to have sufficient inhibiting value to warrant their commercial use, and no claim is made to the use of any particular recognized gum inhibitor. However, it may be mentioned that better than additive results have been obtained in practice when combining the present type of compounds with selected fractions of hardwood tar, particularly those boiling within the range of approximately 220 to 300° C. In such cases a mutually cooperative effect may be noticed so that both the color and the gum inhibitors function more efficiently for their respective purposes.

As an example of the action of compounds of the present character in preventing the development of color and haze the following is cited although it is only an isolated case which is characteristic of the general effects obtained by using other compounds alternatively. It is to be understood that the soaps formed by combining the various amines and organic acids, while having in practically all cases a positive color inhibiting effect, are in no sense exact equivalents in this respect since each compound will exert its own specific action in any given gasoline. In some cases particular soaps may show maximum value in one type of gasoline while others show better effects in gasoline from other sources.

A soap was made by reacting triamylamine with oleic acid at slightly elevated temperatures. This soap was added in an amount of 0.01% by weight to a blended gasoline containing both straight run and cracked constituents. The gasoline was tested before and after the addition of the inhibitor by exposure for 15 minutes to the radiant effect of a powerful arc light under standard conditions of temperature, distance from the radiating source and the character of the glass container in which the sample was placed. The uninhibited sample showed a definite haze at the expiration of the 15 minutes test period and showed a color of 25 on the Saybolt scale whereas the sample before testing was +30. The inhibited sample was entirely clear at the end of 15 minutes and showed a color of 29.

The amount of inhibitor to be added to a particular motor fuel will vary widely depending on the constituents thereof, but in most cases, amounts of 0.005% to 0.5% by weight of motor fuel, will be found sufficient.

The character of the invention and the results obtainable by its use are sufficiently disclosed and exemplified in the preceding specification and single instance of results obtained, but the generally broad scope of the invention is not to be limited by the details of the description or the numerical data presented.

I claim as my invention:

1. A process for the treatment of motor fuel comprising cracked gasoline to prevent deterioration of the same, particularly in respect to color, which comprises adding to said motor fuel a relatively small amount of the reaction product formed by the admixture of a fatty acid and an aliphatic amine.

2. A process for the treatment of motor fuel comprising cracked gasoline to prevent deterioration of the same, particularly in respect to color, which comprises adding to said motor fuel a relatively small amount of the reaction product formed by the admixture of a fatty acid and an alkyl amine wherein the alkyl radical contains more than four carbon atoms.

3. A process for the treatment of motor fuel comprising cracked gasoline to prevent deterioration of the same, particularly in respect to color, which comprises adding to said motor fuel a relatively small amount of the reaction product formed by the admixture of a fatty acid and an aliphatic amine having more than one aliphatic radical each containing more than four carbon atoms.

4. A process for the treatment of motor fuel comprising cracked gasoline to prevent deterioration of the same, particularly in respect to color, which comprises adding to said motor fuel a relatively small amount of the reaction product formed by the admixture of a fatty acid of high molecular weight and an aliphatic amine.

5. A process for the treatment of motor fuel comprising cracked gasoline to prevent deterioratoin of the same, particularly in respect to color, which comprises adding to said motor fuel a relatively small amount of the reaction product formed by the admixture of oleic acid and an aliphatic amine.

6. A process for the treatment of motor fuel comprising cracked gasoline to prevent deterioration of the same, particularly in respect to color, which comprises adding to said motor fuel a relatively small amount of the reaction product formed by the admixture of oleic acid and triamylamine.

7. A process for the treatment of motor fuel comprising cracked gasoline to prevent deterioration of the same, particularly in respect to color and gum formation, which comprises adding to said motor fuel a relatively small amount of the reaction product formed by the admixture of oleic acid and triamylamine and a relatively small amount of a fraction of hardwood tar boiling within the range of approximately 220° C. to 300° C.

8. A method for stabilizing gasoline containing color-forming bodies, which comprises adding to the gasoline a relatively small amount of the reaction product formed by the admixture of an aliphatic amine and a fatty acid.

9. A method of inhibiting discoloration of hydrocarbon material containing color-forming bodies, which comprises adding to the hydrocarbon material a relatively small amount of the reaction product formed by the admixture of an alkylamine and a fatty acid.

10. Gasoline normally tending to discolor and containing the reaction product formed by the admixture of an alkylamine and a fatty acid in sufficient amount to inhibit discoloration.

11. Motor fuel comprising cracked gasoline and containing a relatively small amount of the reaction product formed by the admixture of an aliphatic amine and a fatty acid.

WAYNE L. BENEDICT.